United States Patent Office 3,170,576
Patented Feb. 23, 1965

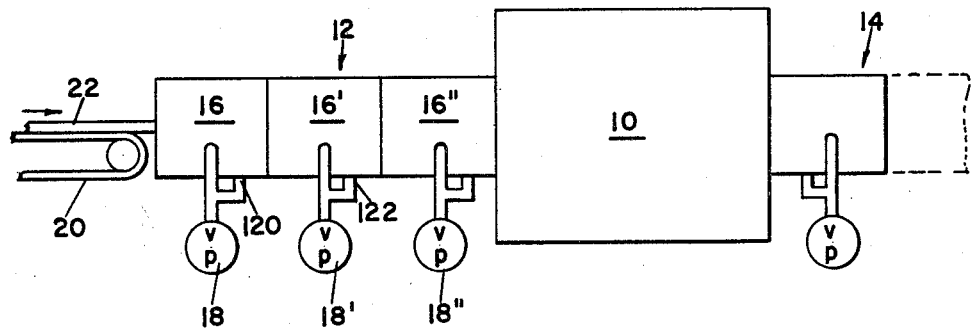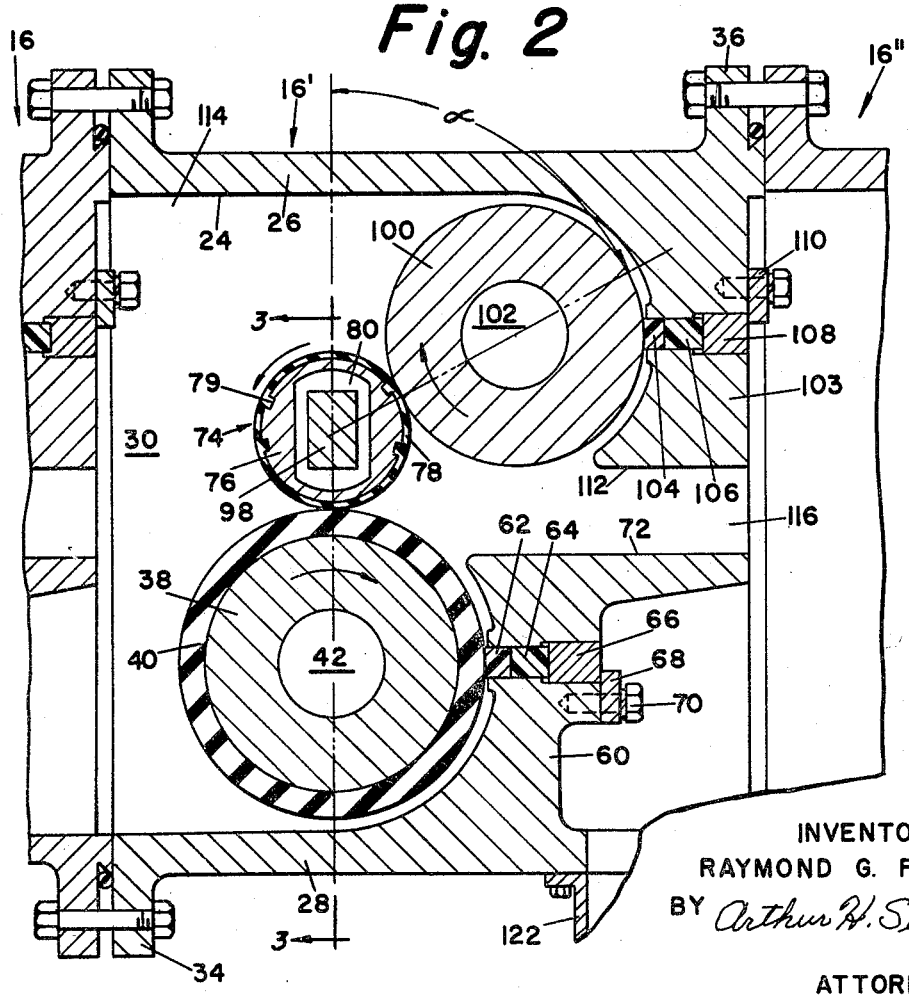

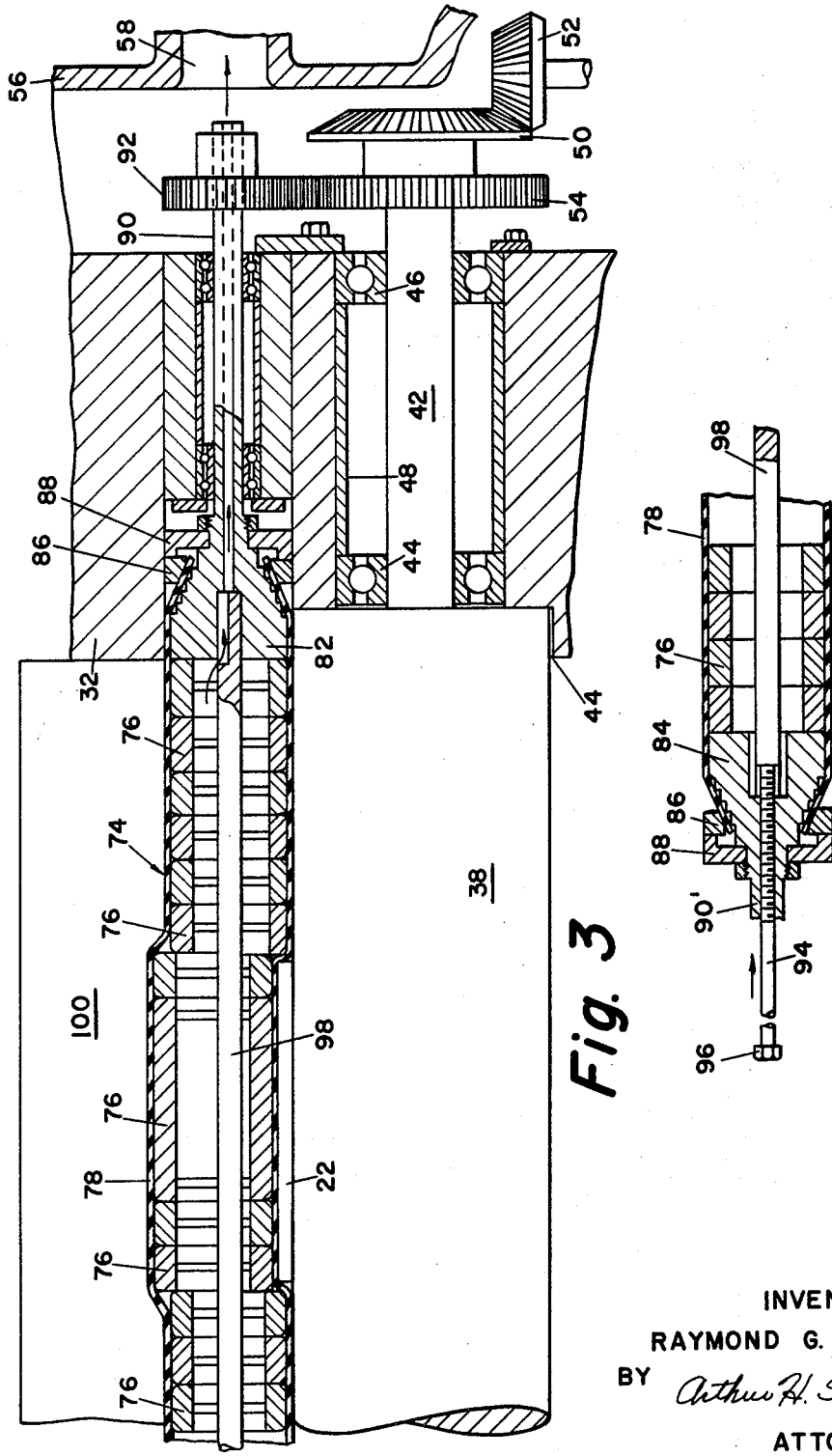

3,170,576
ROTARY SEAL
Raymond G. Frank, Ambler, Pa., assignor, by mesne assignments, to Pennsalt Chemicals Corporation, Philadelphia, Pa., a corporation of Pennsylvania
Filed Aug. 24, 1962, Ser. No. 219,238
8 Claims. (Cl. 214—17)

This invention relates to a rotary seal, and more particularly, to a rotary seal inlet and outlet means for a chamber having a controlled atmosphere therein.

In a wide variety of industrial processes, there is provided a chamber having a controlled atmosphere therein. The controlled atmosphere may be a vacuum, an inert gas, etc. There is a need for a rotary seal inlet and outlet means for the chamber which enables materials to pass through the chamber without affecting the controlled atmosphere therein.

The rotary seal of the present invention includes a segmented roller which facilitates the introduction of varying widths of sheet or strip material with the minimum amount of leakage across the rollers. A means is provided to control the pressure at the ends of the rollers in conjunction with the interior of the seal at each seal unit. Preferably, a plurality of seal units are disposed in series so that the pressure reduction between atmosphere and the interior of the chamber having a controlled atmosphere is accomplished gradually or in stages.

One of the rollers in each seal unit includes a plurality of segments disposed side by side within an elastic sleeve. In this manner, varying widths of material may be accommodated with minimum leakage across the rollers. A torsion bar may be disposed within the elastic sleeve and extending through a central hole in each segment to limit the extent of rotation of each segment and to facilitate contraction of the elastic sleeve. The interior of the elastic sleeve is preferably evacuated to prevent the formation of bubbles due to the pressure drop across the rollers.

It is an object of the present invention to provide a novel rotary seal.

It is another object of the present invention to provide a novel rotary seal which facilitates the introduction of varying widths of material into a housing with a maximum pressure drop across the seal.

It is another object of the present invention to provide a housing or container having a controlled atmosphere therein and novel inlet and outlet seals for the housing to prevent contamination of the controlled atmosphere.

It is another object of the present invention to provide a housing which facilitates minimum leakage between inlet and outlet ports thereof while permitting sheet-like material to pass therethrough.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a side elevation view of the apparatus of the present invention.

FIGURE 2 is a transverse sectional view through one of the seal units illustrated in FIGURE 1.

FIGURE 3 is a sectional view taken along the lines 3—3 in FIGURE 2.

FIGURE 4 is a sectional view of the end of the top roller in FIGURE 3.

Referring to the drawing in detail wherein like numerals indicate like elements, there is shown in FIGURE 1 an apparatus which may be a part of a wide variety of different industrial processes. Such apparatus includes a container 10 having a chamber therein within which is a controlled atmosphere. Such controlled atmosphere may be a vacuum, an inert gaseous atmosphere, etc. The container 10 is provided with identical inlet and outlet seal means 12 and 14, respectively. Hence, only inlet seal means 12 will be described in detail.

The inlet seal means 12 comprises a plurality of identical seal units 16, 16' and 16" disposed in series with one another. The interior of unit 16 may be evacuated by vacuum pump 18. The interior of unit 16' may be evacuated by vacuum pump 18'. The interior of unit 16" may be evacuated by vacuum pump 18". The pressure drop across unit 16 is larger than the drop across unit 16'. The pressure drop across unit 16' is larger than the drop across unit 16".

The inlet side of unit 16 is in communication with atmosphere so that material 22 which may be in sheet, strip, or bar form may be fed therethrough by means of conveyor 20. Since each of the units 16, 16' and 16" are identical, only unit 16' will be described in detail. Unit 16' is shown in transverse section in FIGURE 2. Unit 16' includes a housing 24 having a top wall 26, a bottom wall 28, and parallel side walls 30 and 32. The housing 24 is provided with a front flange 34 to facilitate coupling thereof to the unit 16. Housing 24 is also provided with a rear flange 36 to facilitate coupling of the same to unit 16".

A first cylindrical roller 38 is rotatably supported by axle 42 between the walls 30 and 32. Roller 38 may be provided with a coating 40 of an elastomeric material which prevents scratching of the material 22. As shown more clearly in FIGURE 3, the axle 42 is provided with spaced bearings 44 and 46. A spacer sleeve 48 is disposed between the bearings. The axle 42 projects beyond the wall 32 and terminates in a bevel gear 50. Gear 50 is in meshing engagement with pinion 52 which is adapted to be connected to a source of rotary motive power.

A gear box housing 56 is coupled to the end wall 32 to house the gears. The housing 56 is provided with an outlet port 58 which is adapted to be in communication with vacuum pump 18'. The space between the bearings and the juxtaposed surfaces of the wall 32 facilitates evacuation of the end of roller 38. Axle 42 is provided with a gear 54 adjacent gear 50 for a purpose to be described hereinafter.

Housing 24 is provided with a wall 60 extending upwardly from the bottom wall 28. An elongated slot having a length corresponding to the length of roller 38 is provided in wall 60. A wiper seal 62 is disposed in said slot in rubbing engagement with the periphery of roller 38. Seal 62 may be made from a material such as Teflon. A rubber spring 64 is disposed behind the wiper seal 62. A metal retainer bar 66 is disposed behind the rubber spring 64 and maintained in the illustrated disposition by means of a holding member 68. Member 68 is coupled to wall 60 by a plurality of bolts 70. Roller 38, seal 62, spring 64 and retainer bar 66 may have a length up to sixty inches.

The upper surface of wall 60 is a flat surface 72 lying in a plane slightly below the uppermost surface on roller 38. The roller 38 is tangent to and in abutting engagement with the outer peripheral surface on a roller 74. Hereinafter, roller 74 may be referred to as a second roller. Roller 74 is comprised of a plurality of segments 76 disposed side by side within an elastic sleeve 78. Each of the segments 76 is provided with a hole 80 therethrough for a purpose to be described hereinafter. As shown more clearly in FIGURE 3, the segments 76 need not be of the same length. Each segment 76 may reciprocate in a direction perpendicular to the longitudinal axis of roller 74.

Roller 74 is provided with terminal members 82 and 84 as shown more clearly in FIGURES 3 and 4. Each of the terminal members is provided with a portion corresponding to the outer periphery of the segments 76, a second portion which is stepped radially inwardly, and a hollow extension. The hollow extension on member 82 is designated as 90. The hollow extension on member 84 is designated as 90'. The ends of the elastic sleeve 78 are secured to the terminal members 82 and 84 by a collar 86 and a retainer 88 which cooperate with the stepped portion on each terminal member. A nut is threadedly engaged to the outer periphery of the hollow extensions 90 and 90' and facilitates selective adjustment of the collar 86 and retainer 88.

The hollow extension 90 extends into the gear box housing 56 to facilitate the evacuation of the interior of the elastic sleeve 78. A gear 92 is secured to the hollow extension 90 to rotatably drive the same. Gear 92 is meshed with gear 54.

To facilitate rotation of the roller 74, the hollow extensions 90 and 90' are rotatably supported by bearings in the walls 30 and 32. A torsion bar 98 extends through the hole 80 in each of the segments 76. The ends of the torsion bar 98 are received within splined sockets in the terminal members 82 and 84. Hence, rotation of gear 92 will cause the terminal members 82 and 84 to rotate about an axis parallel to the longitudinal axis of axle 42.

The hollow extension 90' receives a threaded rod 94. One end of rod 94 is provided with a head 96 to facilitate rotation of the same. The other end of rod 94 is in abutting engagement with one end of torsion bar 98. Sleeve 78 embracingly grips the segments 76 as a result of pre-tensioning the sleeve. Rotation of rod 94 in one direction places bar 98 in compression and causes the elastic sleeve 78 to stretch thereby further contracting the same about the periphery of the segments 76, and providing transverse clearance between any two adjacent segments 76. If desired, sleeve 78 may have splines 79 on its inner surface.

The second roller 74 is tangent to and in rolling engagement with a backup roller 100 which may be designated hereinafter as a third roller. The backup roller 100 is an idler roller supported on axle 102. A wall 103 depends from the top wall 26 of the housing 24. A wiper seal 104, similar to seal 62, is in wiping engagement with the outer periphery of roller 100. The seal 104 is spring biased in engagement with the roller 100 by rubber spring 106. A retainer bar 108 is juxtaposed to spring 106 and maintained in the illustrated disposition by holding member 110. The lowermost surface of the wall 103 is defined by the horizontally disposed surface 112.

The inlet side of the unit 16' is designated as 114 and the outlet side is designated as 116. The inlet area 114 and the outlet area 116 of unit 16 are evacuated by pump 18 through a common pumping system which includes pipe 120. Likewise, the inlet area 114 and the outlet area 116 of the unit 16' are evacuated by pump 18' through a common pumping system including pipe 122. The same applies to unit 16''. The interior of the elastic sleeve 78 of each unit is also evacuated through the gear box housing 56 of each unit's pumping system so as to prevent bubbles or other deformations in the sleeve 78 due to the pressure drop thereacross.

If angle alpha in FIGURE 2 were 90 degrees, roller 74 would have maximum horizontal stability and minimal force would be required to displace a portion of roller 74 vertically away from roller 38. If angle alpha were zero degrees, roller 74 would have no horizontal stability and the force necessary to displace a portion of roller 74 becomes very high. Angle alpha controls the flattening pressure and sealing off of roller 74 with rollers 38 and 100. I have found that optimum results are obtained when angle alpha is about 60 degrees for unit 16, about 45 degrees for unit 16', and about 30 degrees for unit 16''.

The operation of the present invention is as follows:

The material 22 to be processed within container 10 is conveyed to unit 16 by conveyor 20. The material sequentially passes through the units 16, 16' and 16'', through the container 10, and then through the outlet seal means 14. The pressure will be gradually reduced by each of the units 16, 16' and 16''. Likewise, the individual units of the outlet seal means 14 will gradually increase the pressure across each unit.

As the material 22 passes through the various units 16, 16' and 16'', it raises only so much of the roller 74 as is required thereby enabling the remainder of the roller 74 to be in contact with the periphery of roller 38. At all times, the entire roller 74 is in contact with roller 100. Thus, as illustrated in FIGURE 3, only the central portion of the roller 74 has been raised to permit the material 22 to pass between the rollers 74 and 38. Hence, a minimum leakage will occur between the rollers. The evacuated gear box housing 56 facilitates evacuating air which would tend to leak pass the end of the rollers. Such leakage at the end of roller 38 would occur in the 270° arc between the seal 62 and the point of tangency with roller 74. Likewise, the end of the roller 100 will be evacuated in the approximately 200° arc between seal 104 and the point of tangency with roller 74. Such end areas of the rollers 38, 74 and 100 are in communication with chamber 114.

The segments above the material 22 in FIGURE 3 tend to rotate and climb up the backup roller 100. The amount of rotation of such segments is limited by contact between the surfaces defining the holes 80 and the periphery of the torsion bar 98. If such limiting means were not provided, these segments would continuously rotate and thereby simulate a twisted rubber band. Sleeve 78 acts as a taut rubber band thereby keeping the assembly straight. Also, each of the segments 76 is individually rotated by contact with the torsion bar 98. The tension of the elastic sleeve 78 may be adjusted, as desired, by rotating the threaded rod 94.

As soon as a sheet of the material 22 has passed between the rollers 38 and 74, the raised segments will immediately descend so as to be tangent to and in rolling contact with the periphery of roller 38. If the next sheet is greater or lesser in width than the preceding sheet, a larger or smaller number of segments will be automatically raised so that sheets of varying widths may be fed between the rollers 74 and 38 with a minimum amount of leakage occurring at all times.

The present invention may be embodied in other specific forms without departing from the spirit or essential attributes thereof and, accordingly, reference should be made to the appended claims, rather than to the foregoing specification as indicating the scope of the invention.

I claim:

1. A seal unit comprising a housing, first and second rollers rotatably supported at their ends by said housing, said rollers being tangent to each other and in rolling engagement with each other, said second roller including a plurality of discrete segments disposed side by side, an elastic sleeve maintaining said segments in such side by side disposition, and means for evacuating the interior of said second roller and the space around the ends of said first roller.

2. A seal unit comprising a housing, first and second rollers rotatably supported at their ends by said housing, said rollers being tangent to each other and in rolling engagement with each other, said second roller including a plurality of discrete segments disposed side by side, an elastic sleeve maintaining said segments in such side by side disposition, said second roller being provided with terminal members, means securing said elastic sleeve to said terminal members, and a bar extending between said terminal members and through said segments and tensioning means operatively connected between said bar and one of said terminal members to stretch said elastic sleeve.

3. Apparatus comprising a container having a controlled atmosphere therein, an inlet seal means for said container, said seal means including a housing rotatably supporting first and second rollers, said first and second rollers being tangent to each other, said second roller including a plurality of discrete sections disposed side by side within an elastic sleeve, means providing a seal between said housing and said rollers, means for rotatably driving at least one of said rollers, means for evacuating the interior of said second roller, said last-mentioned means also being operatively disposed to evacuate the area around the ends of said rollers.

4. A seal unit comprising a housing, first and second rollers rotatably supported by said housing above one another, means providing a seal between said first roller and said housing, said first and second rollers being tangent to and in rolling engagement with each other, a third roller rotatably supported about an axis above the axis of rotation of said second roller and to one side thereof, said third roller being in abutting rolling engagement with and tangent to said second roller, and said second roller including a plurality of discrete sections disposed side by side within an elastic sleeve, and the angle formed by the intersection of a vertical line with the line defined by the longitudinal axes of said second and third rollers being between 30 and 60 degrees.

5. Apparatus comprising a container having a controlled atmosphere therein, an inlet seal means for said container, said seal means including a housing rotatably supporting first and second rollers, said first and second rollers being tangent to each other, said second roller including a plurality of discrete sections disposed side by side within an elastic sleeve, means providing a seal between said housing and said rollers, means for rotatably driving said rollers, a second inlet seal means, said second inlet seal means being identical with said first mentioned inlet seal means and disposed in series with said first mentioned inlet seal means, each inlet seal means including a third roller, said first and second rollers of each inlet seal means being one above the other, the longitudinal axis of the third roller of each seal means being above and to one side of the longitudinal axis of the second roller of its seal means, the angle formed by the intersection of a vertical line with a line defined by the longitudinal axes of said second and third rollers of said second seal means being greater than the corresponding angle for said first seal means.

6. Apparatus comprising a container having a controlled atmosphere therein, an inlet seal means for said container, said seal means including a housing rotatably supporting first and second rollers, said first and second rollers being tangent to each other, said second roller including a plurality of discrete sections disposed side by side within an elastic sleeve, means providing a seal between said housing and said rollers, means for rotatably driving said rollers, a second inlet seal means, said second inlet seal means being identical with said first mentioned inlet seal means and disposed in series with said first mentioned inlet seal means, and means for maintaining the pressure inside said sleeve associated with said first seal means substantially equal to the pressure on the inlet side of said second seal means.

7. A seal unit comprising a housing, first and second rollers rotatably supported at their ends by said housing, said rollers being tangent to each other and in rolling engagement with each other, said second roller including a plurality of discrete segments disposed side by side and an elastic sleeve maintaining the segments in said disposition, a bar extending through each segment of said second roller, each segment having a limited amount of reciprocation in a direction perpendicular to and with respect to the longitudinal axis of said bar, terminal members on said second roller, means securing said sleeve to said terminal members, adjustable means associated with one of the terminal members for tensioning said sleeve, and a third roller supported by the housing for rotation about an axis above the second roller, said third roller having a non-resilient surface in sealing contact with said housing and said second roller.

8. An article of manufacture in the form of a roller adapted to be utilized in a seal unit associated with a container adapted to have a controlled atmosphere therein, said roller comprising a plurality of discrete segments disposed side by side, an elastic sleeve around said segments and maintaining said segments in such side by side disposition, a bar extending through each segment, cooperating surfaces on said bar and said segments so that each segment may have a limited amount of reciprocation in a direction perpendicular to and with respect to the longitudinal axis of the bar, surfaces on said bar and said segments cooperating so that the segments have a limited amount of rotation with respect to the longitudinal axis of the bar, said roller being provided with terminal members, means securing said elastic sleeve to said terminal members, said bar extending between said terminal members, and tensioning means operatively connected between said bar and one of said terminal members for selectively stretching said sleeve.

References Cited by the Examiner
UNITED STATES PATENTS

| | | | |
|---|---|---|---|
| 2,582,280 | 1/52 | Robertson | 226—190 X |
| 2,676,740 | 4/54 | Birkland. | |
| 2,703,654 | 3/55 | Overton | 214—17.4 |
| 2,844,889 | 7/58 | Corbett | 34—242 |
| 3,040,553 | 6/62 | Rust | 34—242 X |

HUGO O. SCHULZ, *Primary Examiner.*

ERNEST A. FALLER, JR., *Examiner.*